United States Patent
Koorapaty et al.

(10) Patent No.: US 8,958,835 B2
(45) Date of Patent: Feb. 17, 2015

(54) WIRELESS DEVICE POSITION DETERMINING AND FREQUENCY ASSIGNING SYSTEMS, DEVICES AND METHODS

(75) Inventors: Havish Koorapaty, Saratoga, CA (US); Kumar Balachandran, Pleasanton, CA (US); Mohammad Imadur Rahman, Sollentuna (SE); Joachim Sachs, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 457 days.

(21) Appl. No.: 13/042,038

(22) Filed: Mar. 7, 2011

(65) Prior Publication Data

US 2012/0231826 A1    Sep. 13, 2012

(51) Int. Cl.
| | |
|---|---|
| *H04B 7/00* | (2006.01) |
| *H04W 24/02* | (2009.01) |
| *H04W 16/16* | (2009.01) |
| *H04W 64/00* | (2009.01) |
| *G01S 5/02* | (2010.01) |
| *H04W 72/04* | (2009.01) |

(52) U.S. Cl.
CPC .............. *H04W 24/02* (2013.01); *H04W 16/16* (2013.01); *H04W 64/003* (2013.01); *G01S 5/0242* (2013.01); *H04W 72/048* (2013.01)
USPC ........ 455/509; 455/434; 455/561; 455/456.2; 455/456.5; 455/517; 370/329; 370/338; 370/331

(58) Field of Classification Search
CPC ....................................................... H04B 7/00
USPC .................... 455/450, 434, 509, 456.1–456.5
See application file for complete search history.

(56) References Cited

U.S. PATENT DOCUMENTS

| | | | |
|---|---|---|---|
| 5,163,004 A  * | 11/1992 | Rentz | 701/300 |
| 8,626,240 B2 * | 1/2014 | Giustina et al. | 455/561 |
| 2006/0211431 A1 | 9/2006 | Mansour et al. | |
| 2008/0299992 A1 | 12/2008 | Eitan et al. | |
| 2008/0318596 A1 | 12/2008 | Tenny | |
| 2009/0088167 A1 | 4/2009 | Jalil et al. | |
| 2009/0215452 A1* | 8/2009 | Balasubramanian et al. | 455/434 |
| 2009/0286544 A1* | 11/2009 | Huber et al. | 455/450 |
| 2010/0120394 A1 | 5/2010 | Mia et al. | |
| 2010/0120447 A1 | 5/2010 | Anderson et al. | |

(Continued)

FOREIGN PATENT DOCUMENTS

| | | |
|---|---|---|
| EP | 2 306 764 A1 | 4/2011 |
| WO | WO 2008/093103 A2 | 8/2008 |

OTHER PUBLICATIONS

International Search Report and Written Opinion of the International Searching Authority, Application No. PCT/IB2011/054492, Aug. 8, 2012.

*Primary Examiner* — Michael T Vu
(74) *Attorney, Agent, or Firm* — Myers Bigel Sibley & Sajovec, P.A.

(57) ABSTRACT

Wireless communication methods determine a position of a first wireless base station. A wireless communication frequency to be used by the first wireless base station is determined by identifying a common frequency that can be used at a plurality of locations surrounding and spaced apart from the position of the first wireless base station that was determined. The first wireless base station may be a femto-base station and the frequency may be an unlicensed frequency. Related systems and devices are also described.

16 Claims, 9 Drawing Sheets

(56) References Cited

U.S. PATENT DOCUMENTS

| | | |
|---|---|---|
| 2010/0216478 A1 | 8/2010 | Buddhikot et al. |
| 2010/0246506 A1* | 9/2010 | Krishnaswamy ............. 370/329 |
| 2012/0063403 A1* | 3/2012 | Moon et al. .................... 370/329 |
| 2012/0214483 A1* | 8/2012 | Tong et al. ..................... 455/434 |

* cited by examiner

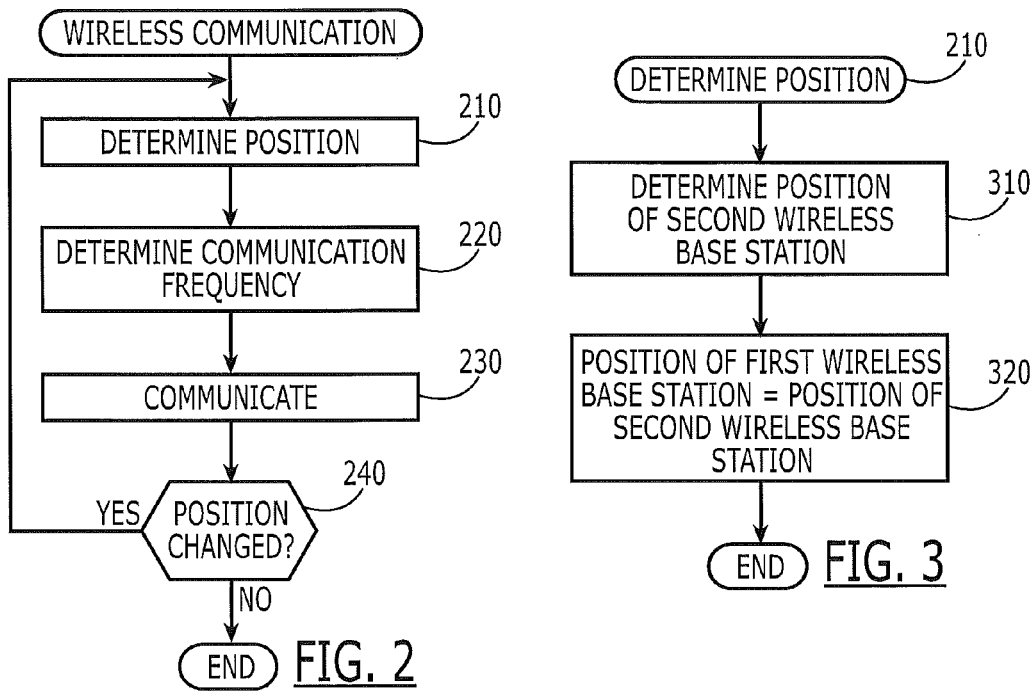
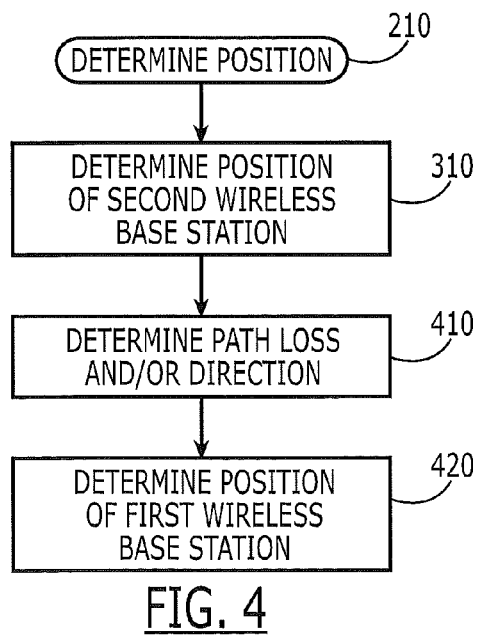

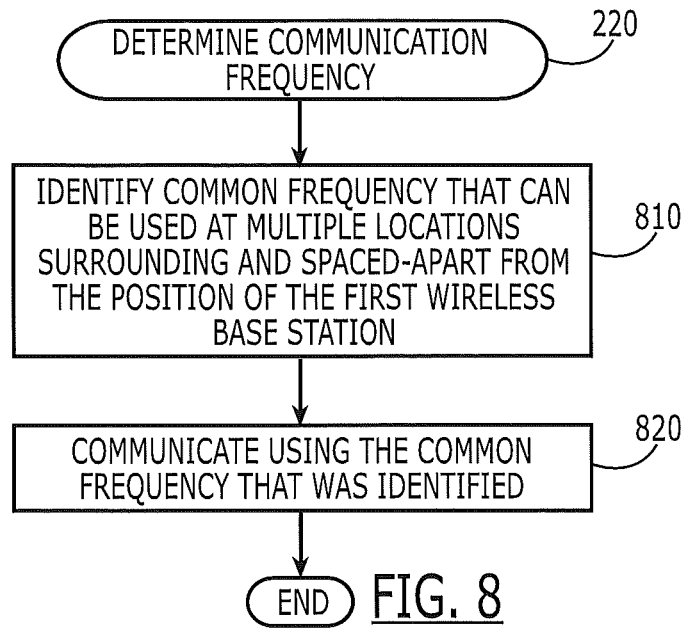
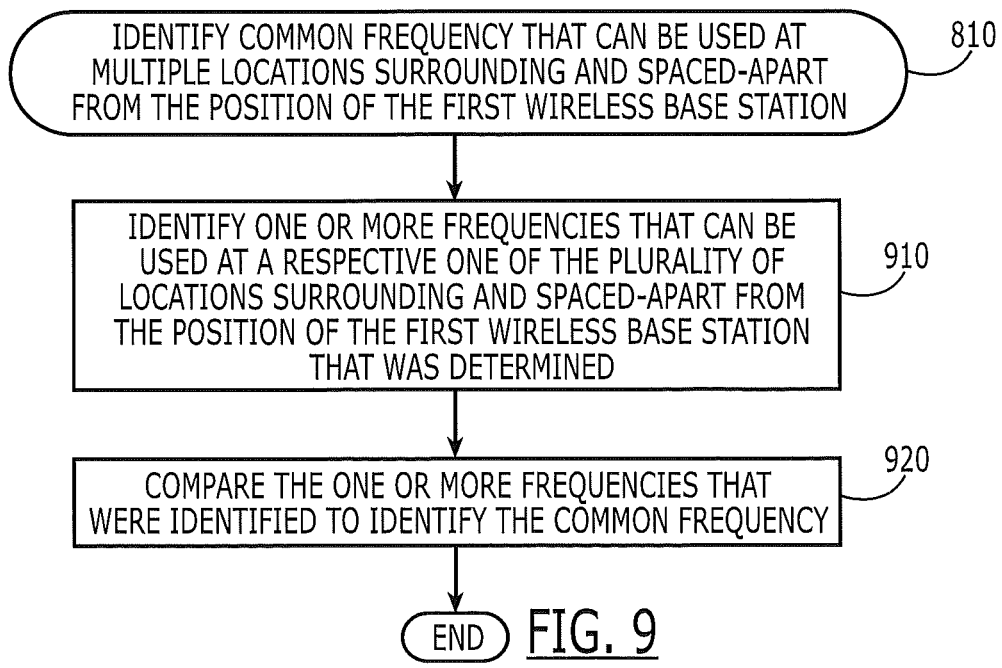

WIRELESS DEVICE POSITION DETERMINING AND FREQUENCY ASSIGNING SYSTEMS, DEVICES AND METHODS

TECHNICAL FIELD

Various embodiments described herein relate to radio frequency communications and, more particularly, to wireless communication networks and devices, and methods of operating same.

BACKGROUND

Wireless communication networks are increasingly being used for wireless communication with various types of wireless user terminals. The wireless network itself may include a plurality of space-apart wireless base stations, also commonly referred to as "base stations", "radio access nodes" or simply as "nodes", that define a plurality of cells, and a core network that controls the base stations and interfaces the base stations with other wired and/or wireless networks. The base stations may be terrestrial and/or space-based. The base stations communicate with the wireless user terminals using radio resources that are allocated to the wireless network. The radio resources may be defined in terms of time (for example, in a Time Division Multiple Access (TDMA) system), frequency (for example, in a Frequency Division Multiple Access (FDMA) system) and/or code (for example, in a Code Division Multiple Access (CDMA) system). The base stations may use licensed and/or unlicensed frequency spectrum. Radio resources may be assigned to wireless user terminals by the wireless network upon initial communication and may be reassigned due to, for example, movement of the wireless user terminals, changing bandwidth requirements, changing network traffic, etc.

Various types of base stations have been employed during the evolution of wireless communications networks to define various types and sizes of cells deployed by an operator. The cellular industry refers to specific types of cells using loosely defined terms such as macro-cells, micro-cells and pico-cells in respective order of decreasing size. While it is difficult to pin down specific characteristics for these categories, cells, now often referred as "macro-cells", are deployed to provide the widest coverage area. Macro-cell base stations may have typical power output ranges from the tens to hundreds of watts, and macro-cell diameters of up to 10 km or more in size may be provided. A typical macro-cell has a site with a tower mounted antenna. Smaller cells, now typically referred to as "micro-cells", were also deployed to provide additional fill-in capacity where needed over relatively short ranges, such as about 300 m to about 2,000 m, and may have an output power of a few watts. Even smaller and lower power base stations, often referred to as "pico-base stations" have been deployed with a power output of less than about 1 watt and a cell size of about 200 m or less. While these definitions are provided to frame the succeeding material, it should be noted that various embodiments described herein relate to a hierarchy with macro-cells having large coverage areas and pico-cells having smaller coverage areas than macro-cells or micro-cells.

The latest type of base station is often referred to as a "femto-base station". These femto-base stations may be designed primarily for indoor coverage, and may have power output in the range of between about $1/10$ to $1/2$ watt, and cell size on the order of about 10-30 m. These femto-base stations typically are portable, consumer-deployed units that may use licensed or unlicensed spectrum. Often, the backhaul to the wireless communications network is via a consumer-provided packet data connection, rather than a dedicated or leased line switched circuit backhaul used in the other types of base stations described. Accordingly, femto-base stations are a type of base station that may be referred to generically as a "re-deployable" base station. Some pico-base stations may be re-deployable as well.

These re-deployable base stations may have various power ranges, backhaul connection mechanisms and/or user terminal frequency spectrum, but can be installed by a customer or user without the need for intervention of a cellular operator. For example, they can be connected to an individual Digital Subscriber Line (DSL) and/or cable TV line, to provide for a broadband Internet connection. The re-deployable base station may be limited in range, as well as limited to be able to provide service to a limited number of user terminals, for example, only user terminals registered to a single customer or a group of affiliated customers, such as a small business.

Since these re-deployable base stations can be connected in numerous locations and be relocated by the customer at any time, it may be desirable to identify an accurate location of the re-deployable base station for purposes of network configuration management, interference reduction, billing and/or other purposes. Unfortunately, however, many re-deployable base stations do not include a built-in position determination system, such as a Global Positioning System (GPS) or other equivalent system for determining the location thereof. Moreover, even if included, these position determination systems may not work well indoors.

Re-deployable base stations as well as other mobile devices may be deployed as secondary devices in spectrum that has already been assigned for primary use. The VHF and UHF spectrum assigned for TV in the USA is an example and is also commonly known as "white space" spectrum. In such cases, current rules and expected future rules for use of such spectrum allow secondary devices to access this spectrum in a license-exempt manner. However, registration with a database that maintains the status of spectrum usage, may be required. This database contains locations of secondary spectrum users. A device intending to use white space spectrum may need to be able to compute its location and then query the database to determine availability of the spectrum. Use of an available channel may then need to be registered with the database.

SUMMARY

Wireless communication methods according to various embodiments described herein, determine a position of a first wireless base station by obtaining a position of a nearby second wireless base station, and determine the position of the first wireless base station from the position of the nearby second wireless base station that was obtained. In some embodiments, a wireless communication frequency to be used by the first wireless base station is determined by identifying a common frequency that can be used at a plurality of locations surrounding and spaced apart from the position of the first wireless base station that was determined. The first wireless base station communicates over the common frequency that was identified.

Various techniques may be used to determine the position of the first wireless base station from the position of the nearby second wireless base station that was obtained. In some embodiments, the position of the first wireless base station is identified as the position of the nearby second wireless base station that was obtained. In other embodiments, the position of the first wireless base station is determined from the position of the nearby second wireless base station that was obtained and from the path loss and/or a direction between the first wireless base station and the nearby second wireless base station.

Moreover, the position of the nearby wireless base station may be obtained by requesting the position of the nearby wireless base station from a core network and obtaining the position of the nearby second wireless base station from the core network. In some embodiments, the core network identifies the nearby second wireless base station using communications from a wireless user terminal that is receiving signals from both the first wireless base station and the nearby second wireless base station. In other embodiments, the requesting of a position of a nearby second wireless base station from the first wireless base station is communicated to the second nearby wireless base station via the core network and the position of the nearby second wireless base station is communicated from the nearby second wireless base station to the first wireless base station via the core network.

Many different techniques also may be used to identify a common frequency that can be used at a plurality of locations surrounding and spaced apart from the position of the first wireless base station that was determined. In some embodiments, one or more frequencies that can be used at a respective one of the plurality of locations surrounding and spaced apart from the position of the first wireless base station that was determined are identified. The one or more frequencies that were identified for the respective ones of the plurality of locations are compared to identify the common frequency that can be used at the plurality of locations surrounding and spaced apart from the position of the first wireless base station that was determined. In some embodiments, the position of the first wireless base station that was determined defines a region of position uncertainty and the plurality of locations surrounding and spaced apart from the position of the first wireless base station span the region of position of uncertainty. Additionally, in some embodiments, a database that is external to the wireless base station is queried to identify the one or more frequencies that can be used at a respective one of the plurality of locations surrounding and spaced apart from the position of the first wireless base station that was determined. These frequencies may be unlicensed frequencies.

Various embodiments have been described above in connection with wireless communication methods. However, analogous wireless communications systems and wireless communications devices, such as wireless base stations, user terminals and/or core network elements such as servers, may also be provided according to various embodiments described herein. Moreover, the aspects of determining a position of a wireless base station and of determining a wireless communication frequency to be used by a wireless base station may also be used separately according to various embodiments described herein.

For example, a wireless base station may comprise a wireless transceiver and a processor that is configured to control the wireless transceiver, to obtain a position of a nearby wireless base station and to determine a position of the wireless base station from the position of the nearby wireless base station that was obtained. The processor may be configured to determine the position of the wireless base station from the position of the nearby wireless base station that was obtained, by identifying the position of the wireless base station as the position of the nearby wireless base station that was obtained, and/or from a path loss and/or a direction between the wireless base station and the nearby wireless base station, as was described above. In other embodiments, the position of the nearby wireless base station may be requested and obtained from the core network and may be communicated from the nearby wireless base station to the wireless base station via the core network. In some embodiments, the wireless base station and/or the nearby wireless base station are re-deployable wireless base stations, such as femto-base stations.

In another example, a server of a wireless communication system according to other embodiments described herein may include an input/output interface that is configured to communicate with the core network and a processor that is configured to determine a common frequency that can be used at a plurality of locations surrounding and spaced apart from a wireless base station in response to a measure of a position of the wireless base station that is received from the input/output interface. As was described above, the common frequency may be identified by obtaining one or more frequencies that can be used at a respective one of a plurality of locations surrounding and spaced apart from the estimated position of the wireless base station, and comparing the one or more frequencies that were obtained to identify the common frequency. As was also described above, the plurality of locations surrounding and spaced apart from the wireless base station can span a region of position uncertainty. As was also described above, a database may be queried to identify the one or more frequencies.

The separate aspects of determining a position of a wireless base station and determining a wireless communication frequency to be used by the wireless base station, were described above in terms of a wireless base station and a server. However, analogous methods may also be provided according to various embodiments described herein. These methods may be performed by the wireless base station, a wireless user terminal and/or an element of the core network such as a server.

Accordingly, a position of a wireless base station and/or a wireless communication frequency to be used by the wireless base station may be determined according to various embodiments described herein. These embodiments may be particularly useful for re-deployable wireless base stations, such as femto-base stations, that can use licensed or unlicensed frequency spectrum.

BRIEF DESCRIPTION OF THE DRAWINGS

FIGS. 2-6 are flowcharts of operations may be performed to provide wireless communication according to various embodiments described herein.

FIGS. 8 and 9 are flowcharts of other operations that may be performed to provide wireless communications according to various other embodiments described herein.

DETAILED DESCRIPTION

Figure 1:
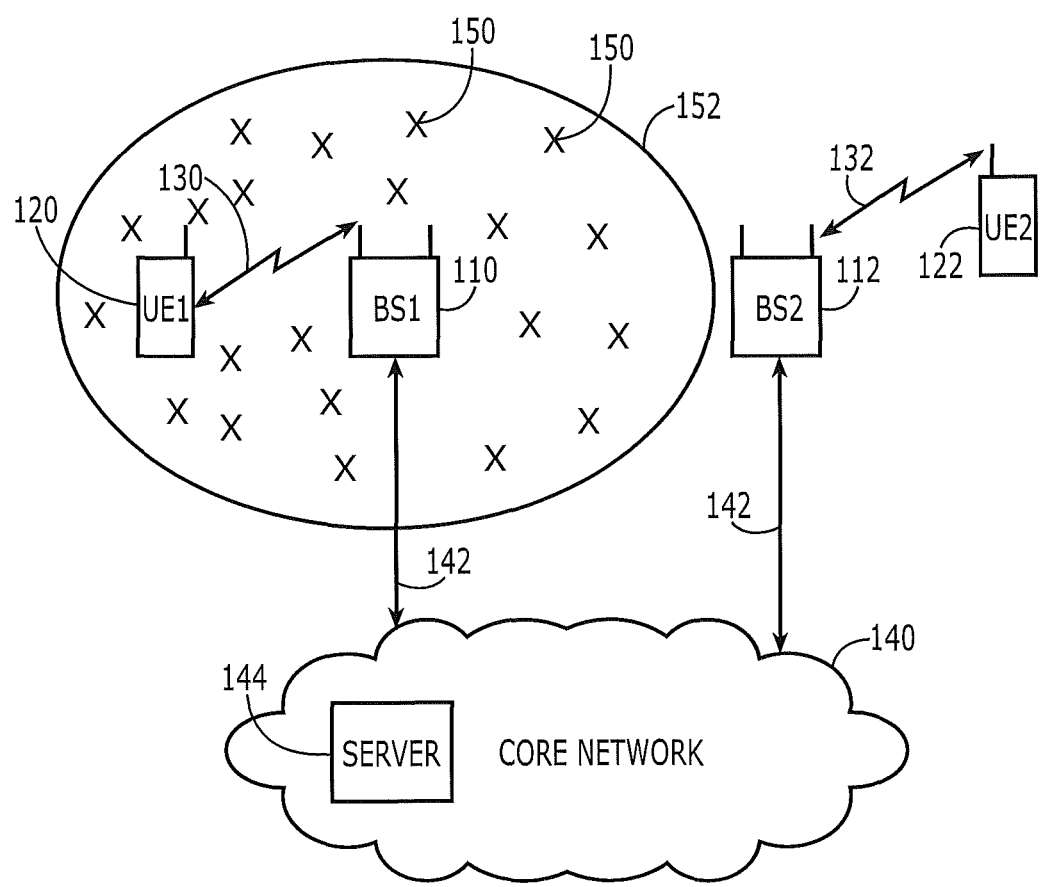
FIG. 1 is a block diagram of wireless communication systems, methods and devices according to various embodiments described herein.

FIG. 1 is a block diagram of wireless communication systems, methods and devices according to various embodiments described herein. As illustrated in FIG. 1, these wireless communication systems/methods/devices include a first wireless base station (BS1) 110 and a second nearby wireless base station (BS2) 112. The first base station 110 communicates with a first wireless terminal, also referred to as a User Equipment 1 (UE1) 120, and the second base station 112 communicates with a second User Equipment 2 (UE2) 122, via first and second wireless links 130 and 132, respectively. The first and second base stations 110 and 112 communicate with a core network 140 using backhaul links 142. The core network 140 may include, or may be connected to, at least one server 144 for position determination and/or frequency assignment. Thus, the server 144 may be included within the core network 140 or may be external thereto.

It will be understood that FIG. 1 only illustrates two wireless base stations 110 and 112, and two pieces of UEs 120 and 122. However, wireless communication systems and methods typically employ large numbers of base stations and user equipment that can communicate with a core network.

In some embodiments, the wireless base stations 110 and/ or 112 comprise re-deployable base stations, such as femto-base stations, that may communicate with the user equipment 120, 122 using wireless links 130, 132 that use licensed wireless communication frequencies and/or unlicensed frequencies. As used herein, the term "unlicensed frequency" includes a frequency that is usable by any user in a license-exempt manner and also includes so-called "white space" frequency spectrum that may be used by secondary users in a license-exempt manner when the primary user (e.g. TV stations) owning the license for the spectrum is not using it. Moreover, in a re-deployable wireless base station, the backhaul links 142 with the core network 140 may be IP-based links over a DSL and/or cable modem rather than conventional leased line backhaul links.

FIG. 2 is a flowchart of operations that may be performed to provide wireless communication according to various embodiments described herein. These operations may be performed by a wireless base station, such as the wireless base stations 110, 112 of FIG. 1, wireless user terminals, such as user equipment 120, 122 of FIG. 1 and/or a core network, such as the core network 140 and/or the server 144 of FIG. 1.

Referring now to FIG. 2, at Block 210, a position of a first wireless base station, such as the first wireless base station 110 of FIG. 1, is determined by obtaining a position of a nearby second wireless base station, such as base station 112 of FIG. 1, and determining the position of the first wireless base station from the position of the nearby second wireless base station that was obtained. It will understood that, as used herein, a "nearby" base station means a base station that is sufficiently close to the base station of unknown position, such that the unknown position of the base station may be determined with a desired degree of accuracy based on a known position of the nearby base station. In some embodiments, a nearby base station comprises a base station that is sufficiently close, such that a common user terminal can directly communicate with both the nearby base station and the base station in question.

In some embodiments, as shown at Block 220, a wireless communication frequency to be used by the first wireless base station, such as the base station 110 of FIG. 1, may be determined by identifying a common frequency that can be used at a plurality of locations, such as the locations 150 of FIG. 1, that are surrounding and spaced apart from the position of the first wireless base station 110 that was determined. These locations 150 may span a region of position uncertainty 152 that is defined by an amount of uncertainty in the position of the first wireless base station 110 that was determined.

Referring back to FIG. 2, at Block 230, the first wireless base station 110 communicates over the common frequency that was identified, for example by using the common frequency that was identified as the wireless link 130 between user equipment 120 and the first base station 110. Finally, at Block 240, if the position of the base station 110 is changed, for example by unplugging and redeploying the re-deployable base station, then the operations of Blocks 210, 220 and 230 are performed again. Until then, operations can end and communication can continue on the identified frequency.

FIG. 3 is a flowchart of operations that may be performed to determine a position of a first wireless base station, which may correspond to Block 210 of FIG. 2. The identity of a second wireless base station may be determined by the first wireless base station by listening for transmissions from nearby base stations. Referring now to FIG. 3, at Block 310, the position of the identified second wireless base station 112 is determined. The position of the second wireless base station 112 may be determined by the second wireless base station 110 and/or by the core network 140 including the server 144. Then, at Block 320, the position of the first wireless base station 110 is identified as the position of the nearby second wireless base station 112 that was obtained. In other words, in these embodiments, the position of the first wireless base station 110 is made equal to the position of the second wireless base station 112. Since, in the case of re-deployable base stations, such as femto-base stations, the transmissions occur over a very small area, such as on the order of 10-30 m, this assumption may provide a sufficiently accurate determination of the position of the first wireless base station 110.

FIG. 4 is a flowchart of operations that may be performed to determine a position of the first wireless base station 110 according to other embodiments described herein, and may also correspond to operations of Block 210. In these embodiments, the position of the second wireless base station 112 is determined as was described above in connection with Block 310. Then, at Block 410, a path loss between the first and second wireless base stations and/or a direction between the second wireless base station 112 to the first wireless base station 110 is determined. Finally, at Block 420, the position of the first wireless base station 110 is determined from the position of the second wireless base station 112 that was obtained and from the path loss and/or direction that were determined. Additional details will be provided below.

Figure 5:
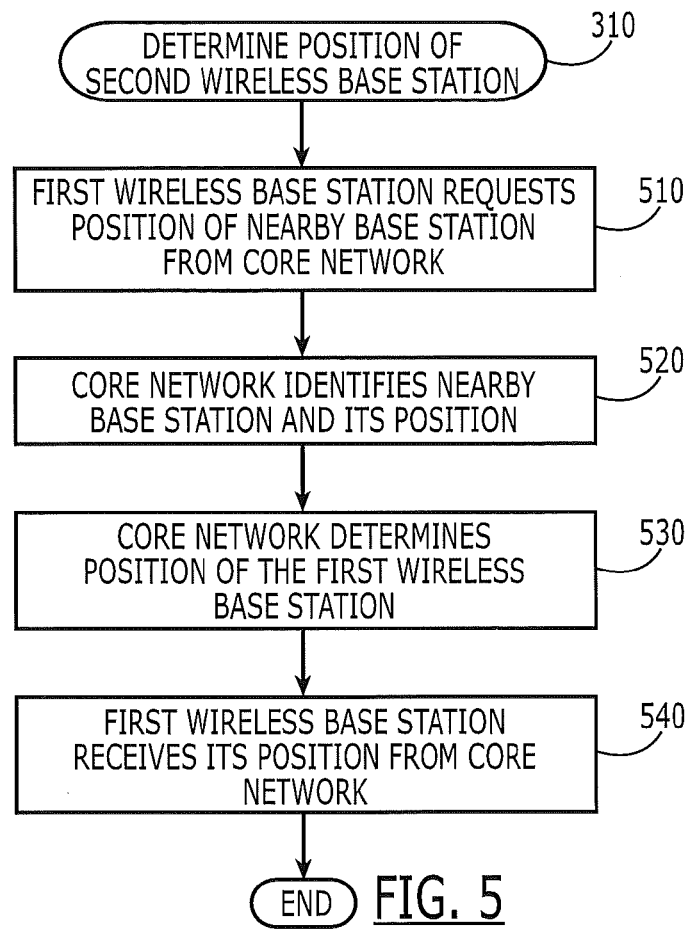

FIG. 5 is a flowchart of operations that may be performed to determine a position of the second wireless base station 112, which may correspond to operations of Block 310 of FIGS. 3 and 4. These operations may be performed by the first and/or second wireless base stations 110 and 112 of FIG. 1 and/or by the core network 140 of FIG. 1 including server 144.

Referring to FIG. 5, at Block 510, the first wireless base station 110 requests the position of a nearby base station from the core network. Then, at Block 520, the core network 140 including the server 144, identifies the nearby base station and its position. Identification of the nearby base station may be obtained using the UE reports for nearby base stations. At Block 530, the core network determines the position of the first wireless base station 110 from the identification of the nearby base station and its position, for example using operations of Blocks 320, 410 and/or 420 described above. When operations of blocks 410 and 420 are used, measurement data, e.g., may be transferred from the first base station to the core network. Then, at Block 540, the wireless base station 110 receives its position from the core network.

Figure 6:
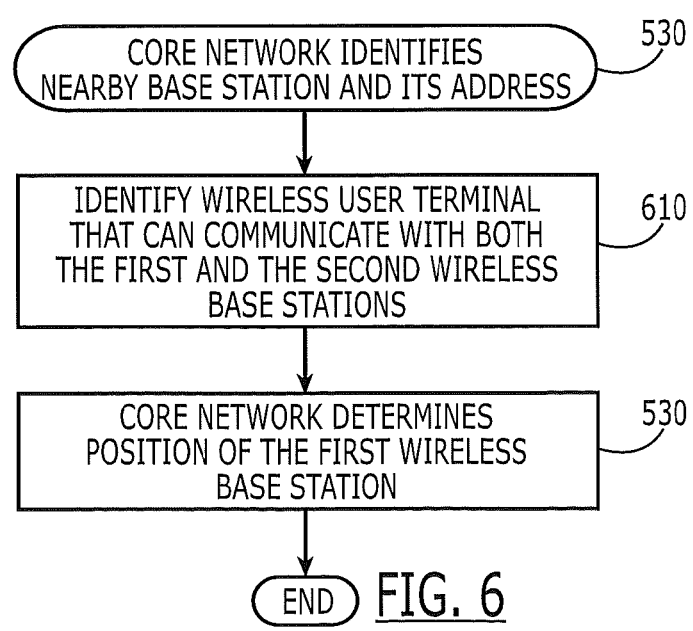

Various techniques may be used by the core network at Block 520. For example, as shown in FIG. 6 at Block 610, a wireless user terminal is identified by the core network that can communicate with both the first and the second wireless base stations. Thus, communications with a common wireless user terminal would indicate that the wireless user terminal is receiving signals from both the first wireless base station 110 and the nearby second wireless base station 112 because the two base stations are quite close to one another. Then, at Block 530, the core network determines the position of the first wireless base station 110 based on the second base station 112 that was identified at Block 610.

It will be understood that operations of FIGS. 3-6 have been described above in connection with a wireless communication system/method of FIG. 2, wherein a position is determined at Block 210, and a communication frequency is determined at Block 220. However, embodiments of FIGS. 3-6 may also be used independent of determining a wireless communications frequency to be used at Block 220 of FIG. 2.

Figure 7A:
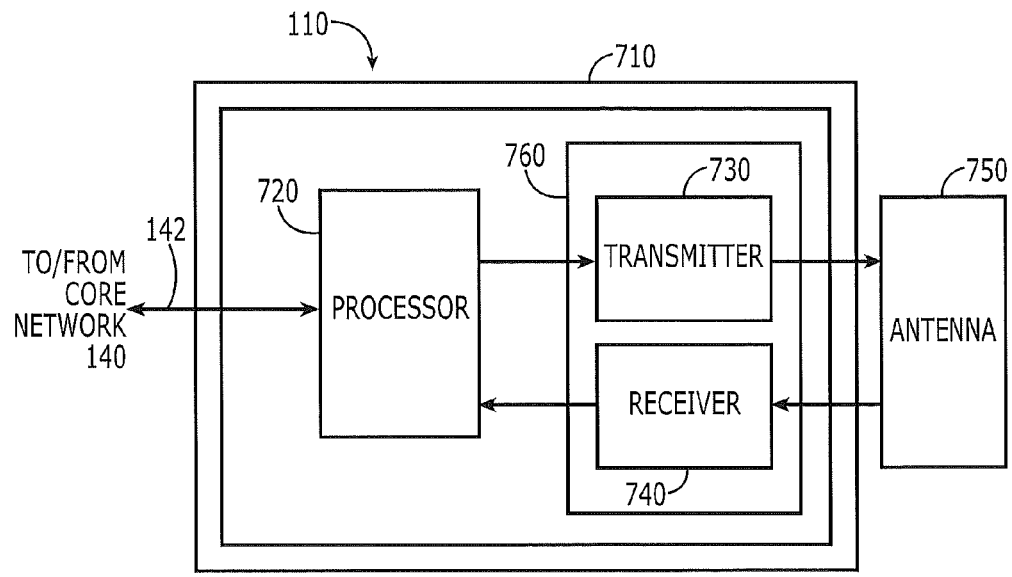
FIG. 7A is a block diagram of a wireless base station according to various embodiments described herein.

Thus, according to other embodiments described herein, a wireless base station may be provided as illustrated in FIG. 7A. The wireless base station, such as the wireless base station 110 of FIG. 1, includes a re-deployable housing 710 that is portable and that may be placed, moved, installed and reinstalled by a consumer. A processor 720, a transmitter 730, a receiver 740 and an antenna 750 may also be provided. The transmitter and receiver may be at least partially combined in a transceiver 760. The antenna 750 may include one or more antennas that can communicate with the transceiver 760 through one or more antenna ports. The processor 720 may be coupled to the core network, such as the core network 140 of FIG. 1, for example using a link 142 such as an IP link over DSL and/or cable. The processor 720 may be configured, at least in part, to control the wireless transceiver 760, and to obtain a position of a nearby wireless base station using transceiver 760 and/or link 142. The processor 720 may be further configured to obtain and/or determine a position of the wireless base station from the position of the nearby wireless base station that was obtained. Accordingly, a wireless base station 110 according to embodiments of FIG. 7A may be configured to perform operations of Blocks 310, 320, 410, 420, 510 and/or 540. In other embodiments, the core network 140 including the server 144 may perform one or more of these operations.

Figure 7B:
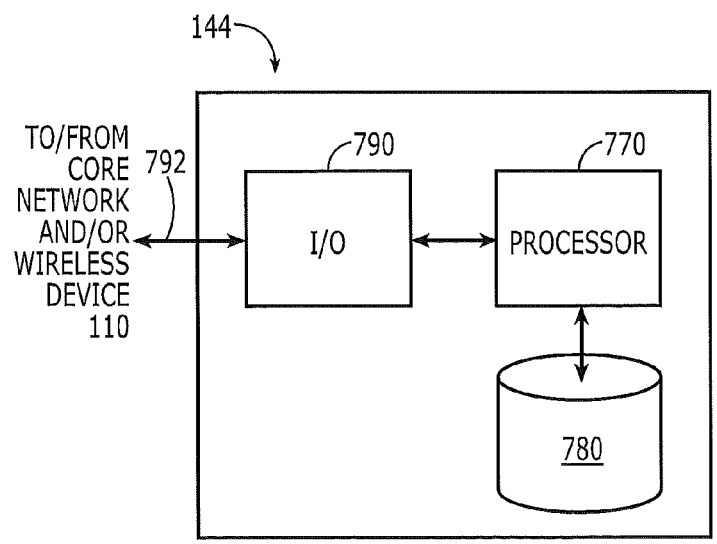
FIG. 7B is a block diagram of a server according to various embodiments described herein.

Moreover, according to other embodiments described herein, a server may be provided as illustrated in FIG. 7B. The server, such as the server 144 of FIG. 1, may be included within the core network 140 or may be external thereto. The server 144 includes an input/output (I/O) interface 790 that is configured to communicate with the core network 140 and/or the wireless base stations 110, 112 over one or more links 792, a processor 770 and a database 780. The processor 770 may be configured, at least in part, to identify a position of a nearby wireless base station and/or to obtain and/or determine a position of a wireless base station from the position of a nearby wireless base station that was obtained. Accordingly, a server 144 according to embodiments of FIG. 7B, may be configured to perform operations of Blocks 310, 320, 410, 420, 510, 520, 530, 540 and/or 610 based on measurements supplied by the wireless base stations and/or wireless user terminals as needed. In other embodiments, the wireless base station may perform one or more of these operations using its own I/O interface and processor.

FIG. 8 is a flowchart of operations that may be performed to determine a communications frequency to be used by the first wireless base station, and may correspond to operations of Block 220 of FIG. 2. These operations may be performed by the first and/or second wireless base stations 110 and/or 112 of FIG. 1, and/or the core network 140 of FIG. 1 including by the server 144. In some embodiments, these operations may only be performed if the accuracy of the estimated position is worse than about 50 meters or some other accuracy value.

Referring now to FIG. 8, at Block 810, a common frequency that can be used at a plurality of locations surrounding and spaced apart from the first wireless base station 110, is identified if the position estimate of the wireless base station is inaccurate. Determining communications frequency may involve communication with a server on the Internet outside of the core network that may host a database being used to manage spectrum usage. Specifically, in some embodiments, a server 144 can determine the common frequency in response to a measure of a position of a wireless base station 110 that is received via the input/output interface 790 of FIG. 7B. The server may receive the position directly from the wireless base station without direct core network involvement. Although the packets may flow over the core network, the position information may be sent over a TCP/IP interface so that the core network has no knowledge of the communications between the wireless device and the server. In other embodiments, the core network may obtain the position of the wireless base station and provide this position to the server. In some embodiments, the position of the first wireless base station that was determined defines a region of position uncertainty, and the plurality of locations surrounding and spaced apart from the position of the first wireless base station span the region of position of uncertainty. Then, at Block 820, the first wireless base station communicates over the common frequency that was identified.

FIG. 9 is a flowchart of operations that may be performed to identify the common frequency, which may correspond to Block 810 of FIG. 8. In some embodiments, these operations are performed by the core network 140 including the server 144. However, in other embodiments, the operations may be performed, at least in part, by the wireless base station 110.

Referring now to FIG. 9, at Block 910, one or more frequencies are identified that can be used at a respective one of the plurality of locations, such as the locations 150 surrounding and spaced apart from the position of the first wireless base station that was determined. Then, at Block 920, the one or more frequencies that were identified for the respective ones of the plurality of locations are compared to one another, to identify the common frequency that can be used at the plurality of locations 150 surrounding and spaced apart from the position of the first wireless base station that was determined. In some embodiments, the operations of Block 910 may be performed by querying a database that is external of the wireless base station 110, for example the database 780 that is associated with the server 144, to identify the one or more frequencies that can be used at a respective one of the plurality of locations surrounding and spaced apart from the position of the first wireless base station that was determined. Moreover, in other embodiments, the comparison of Block 920 is also performed at the core network, for example by the server 144, using the results of the database query, and the common frequency that was then determined is provided to the wireless base station 110 via the links 792 and 142.

Various embodiments of FIGS. 8 and 9 have been described above in connection with embodiments of FIG. 2. However, embodiments of FIGS. 8 and 9 may also be used independent of embodiments of FIG. 2. For example, referring back to FIG. 7, the processor 720 of the wireless base stations 110 and/or the processor 770 of the server 144 may be configured to identify the common frequency that can be used at the plurality of locations surrounding and spaced apart from the wireless base station 110. The processor may be further configured to control the wireless transceiver 760 to wirelessly communicate over the common frequency that was identified. It will be understood that, in some embodiments, the processor 720 of the wireless base station 110 itself may perform the operations of Block 810, 820, 910 and 920. In other embodiments, the operations of Blocks 810, 910 and 920 may be performed by the core network 140, for example by the server 144, and the processor 720 of the wireless base station 110 may be configured to obtain the common frequency from the core network over links 792 and 142 and to control the transceiver 760 to communicate using the common frequency that is identified at Block 820.

Additional discussion of various embodiments will now be provided. Specifically, demand for mobile broadband services is increasing rapidly and the availability of spectrum is becoming a limiting factor. Among many plans being drawn up by regulatory bodies and wireless communications enterprises to make more spectrum available, the use of so-called spectrum "white spaces" is a technique that is gaining in prominence. Such white spaces are essentially unused parts of spectrum that have been licensed for some other purpose, e.g., digital TV broadcasting. To facilitate the use of such whitespace devices, one technique that is being employed is the use of a database which provides information about possible transmission based on the position of a device intending to use white space spectrum. In the case of the US Federal Communications Commission (FCC), the database contains a list of useable channels at the queried position with the transmission parameters being fixed. The database may provide other transmission parameters, such as antenna pattern, direction, transmit power allowed, etc. In the case of the Cognitive Radio System—White Space (470-790 MHz) Working Group SE43, the database provides the maximum transmit power that may be used at the queried position.

All white space devices need not query the database on their own. A white space device manager or server can query the database on behalf of one or more white space devices with different locations for the white space devices. Alternately, the device manager can query the database for a region potentially containing one or more white space devices. An example of such a group query is one from a base station that inquires about the useable channels for the uplink for all user equipment within range of its cell. At a higher level in the network hierarchy, a network management node may query all the useable channels for the downlink or uplink that may be used by multiple base stations in an area.

A good candidate for use of white spaces are femto-base stations (hereinafter referred to as "femto-BS"). This is true due to at least several reasons. First, femto-BS generally operate indoors and transmit with very low powers so as not to interfere with the macro network. They also can operate as extensions of the outdoor cellular network. However, in order to query a database, a femto-BS needs to know its own position which is not always the case.

Cellular networks provide multiple techniques for computing positions of a wireless terminal (hereinafter referred to as "User Equipment" or "UE") registered with the network. The location techniques may include cell ID, receive signal strength based positioning, time of arrival (TOA) band positioning, time difference of arrival (TDOA) based positioning and/or assisted GPS. In the cell ID technique, the network returns the cell ID of the serving base station or some position derived from this cell ID as the position of the UE. In the receive signal strength based technique, the UE reports the received signal strength from the serving and neighboring base stations. This signal strength signature is compared with a database mapping signal strengths to positions within the coverage area and with further processing a position for the UE is computed. In the TOA and TDOA techniques, the UE computes the time of arrival of signals from multiple base stations. This information may be used to compute the position of the UE either at the UE itself or at a positioning server in the network. For assisted GPS, the cellular network provides side information about the current state of GPS to the UE which helps the GPS receiver inside the UE work at lower signal levels and/or acquire GPS position more quickly. The assistance information typically includes information such as the almanac and ephemeris that provide coarse and fine information respectively regarding the orbits of the GPS satellites and accurate time information. This information may be used by the GPS receiver to reduce the time-frequency search window within which the receiver must search for signals from GPS satellites. Alternately, time and frequency search windows could be directly provided to the GPS receiver by the cellular network. Lastly, the position may also be computed with a standalone GPS receiver where no assistance information is provided to the GPS receiver by the network. This typically leads to very poor indoor performance and long times to first fix.

However, femto-BSs are typically not installed by operators and are most likely to be installed by private parties. Therefore, the operator generally does not have control over where exactly they may be situated. They may also be relocated after the initial installation. Thus, the position of femto-BS is typically not known. Some femto-BS come with GPS receivers but typically they do not work well indoors. In some cases, femto-BSs come with GPS receivers with instructions that they should be installed near a window so that the GPS receiver may work. This often creates problems due to interference with the outdoor cellular network. From an interference point of view, it is better for the femto-BS to be away from the exteriors of the home or office building. In addition to reducing or minimizing interference, such a central location also provides better coverage inside the premises. When femto-BS are not equipped with GPS, its ability to use white space spectrum is limited since it cannot query the database with its own position.

Various embodiments described herein can provide systems/devices/methods for a femto-BS to obtain its own position and query a database, or to initiate a query of the database, so as to be able to use white space spectrum. Other systems/devices/methods allow a femto-BS or any other white space device that is unable to position itself accurately to be able to use white space spectrum nevertheless.

Various embodiments described herein allow the position of the femto-BS to be computed so that a database may be queried to determine if whitespace spectrum could be used at the determined position. The database may be queried by the femto-BS itself or by another manager/controller node on its behalf. Various embodiments described herein also allow a femto-BS or any other whitespace device to use white space spectrum when it is not able to determine its position with the requisite accuracy.

Figure 10:
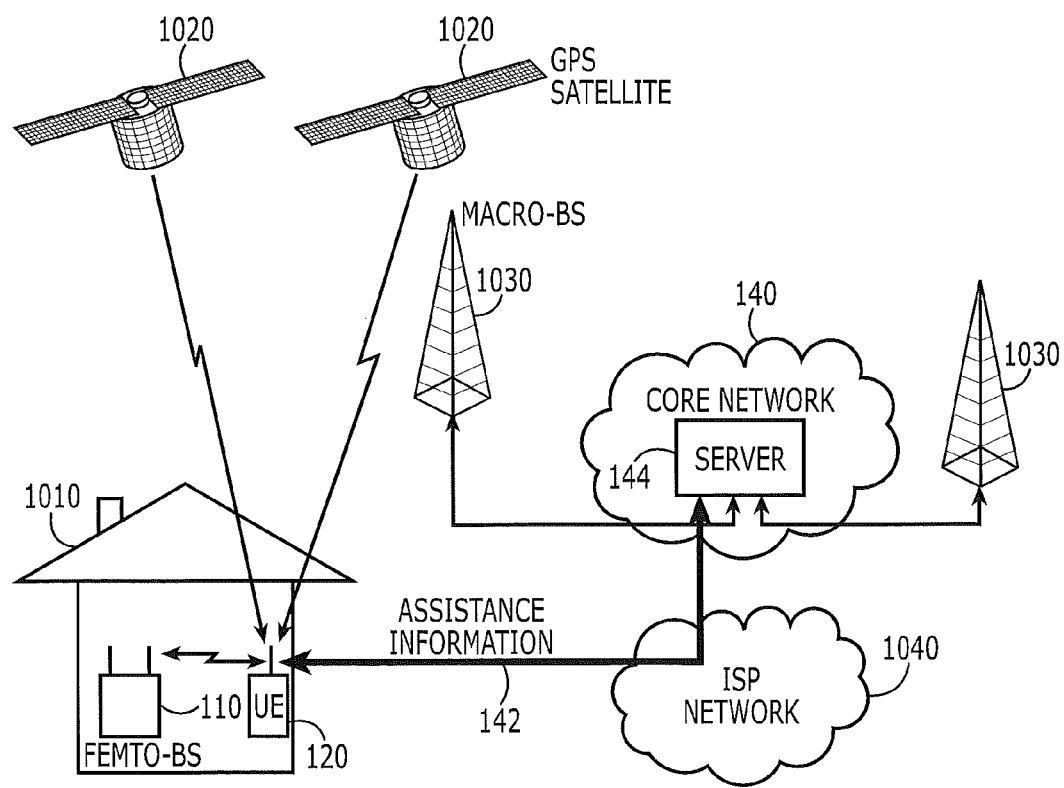
FIGS. 10-13 are block diagrams of wireless communication systems, methods and devices according to yet other embodiments described herein.
Figure 11:
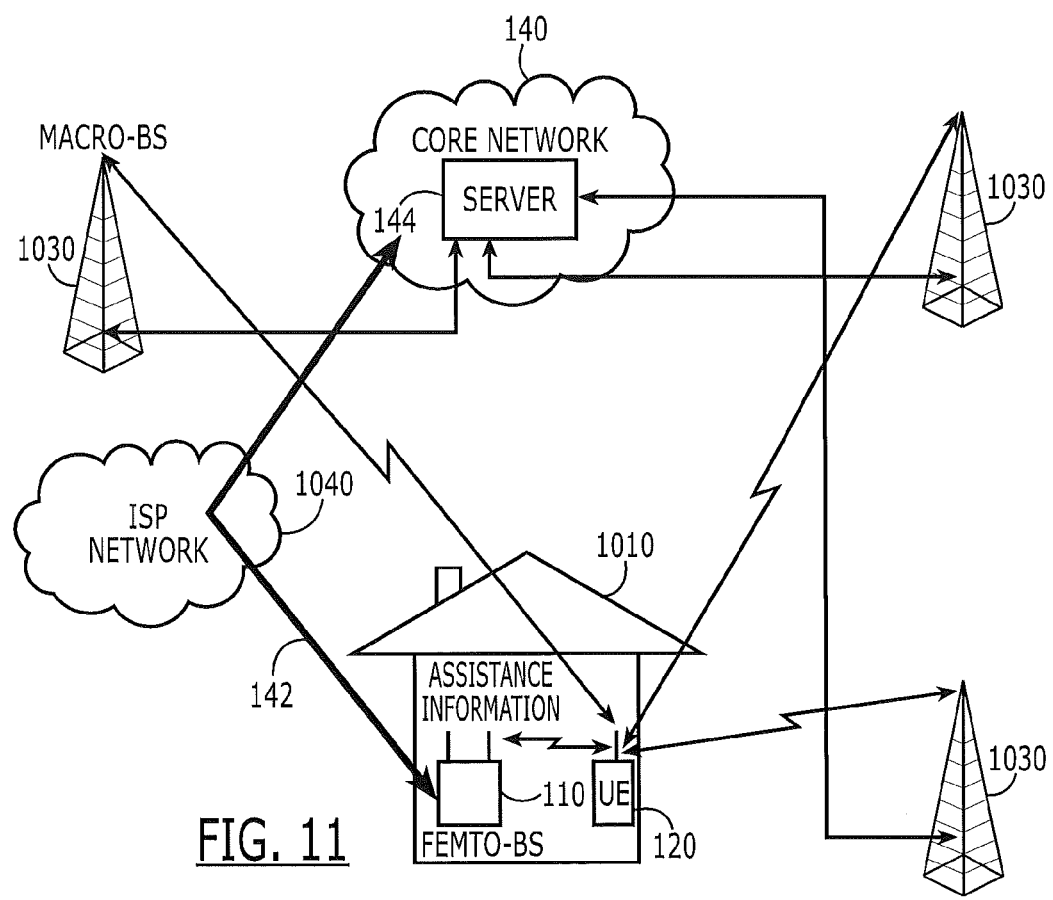

Referring to FIGS. 10 and 11, the position of the femto-BS 110 may be computed using a separate UE 120 whose position is computed first which then enables the computation of the position of the femto-BS 110. The position of the UE 120 may be computed in multiple ways. A cellular network 1030 based positioning method such as cell ID, TOA or TDOA based positioning could be used, as illustrated in FIG. 11. Alternately, as illustrated in FIG. 10, assisted GPS via GPS satellites 1020 may be used if the UE 110 is equipped with a GPS receiver. These techniques were described in detail above and the description will not be repeated. In general, as shown in FIG. 10, GPS data may be obtained by the UE 120 from GPS satellites 1020, and assistance information may be communicated from a position server 144 in a core network 140 over a link 142 via an Internet Service Provider (ISP) network 1040. Alternatively, as shown in FIG. 11, the server 144 may communicate position information over link 142 via the ISP network 1040, and the UE 120 may communicate assistance information to the femto-BS 110, as well.

Indoor operation within a structure 1010 is often an issue with the above positioning techniques, especially for GPS. In some embodiments, other sensors such as a gyroscope, compass and/or an accelerometer that may be present in the UE 120 are used to improve performance. In some embodiments, the position of the UE 120 can be computed via GPS while the UE 120 is outdoors and then the accelerometer and compass can be used to monitor the trajectory of the UE 120 as it is carried inside the structure 1010 towards the femto-BS 110. In this manner, the position of the femto-BS 110 may be obtained using the associated UE 120.

Once the UE 120 position is computed, the femto-BS 110 position could be assumed to be the same as the positioning UE 120 with some uncertainty, which may be quantified based on the measured path loss to the UE 120. The measured path loss could also be used to determine a distance from the UE 120. If the femto-BS 110 has multiple antennas, they may be used to estimate a coarse direction for the UE 120. The direction and distance estimates could be used together to obtain a rough estimate of the position of the femto-BS 110, if desired.

There are two possibilities for an associated UE 120. In the first case, the UE 120 may be a special UE that is provisioned with the femto-BS 110. In the second case, the UE 120 may be any generic UE that connects to the femto-BS 110.

A special purpose UE that is provisioned with the femto-BS 110 may be used to compute its position and then help compute the position of the femto-BS 110. The UE may be an auxiliary device that does not have all the capabilities of a regular UE. The special purpose UE could also have additional positioning capabilities in comparison to a regular UE. For example, it may have WLAN and/or Bluetooth based positioning. It may also be equipped with multiple antennas to enable direction finding methods. The special purpose UE could also be equipped with an indicator light which turns green when the UE is getting good GPS or cellular signal strength.

A generic UE could be a UE or a set of UEs that are already owned by the femto-BS user. Alternately, other UEs that may be capable of connecting to the femto-BS may be used as well.

Figure 12:
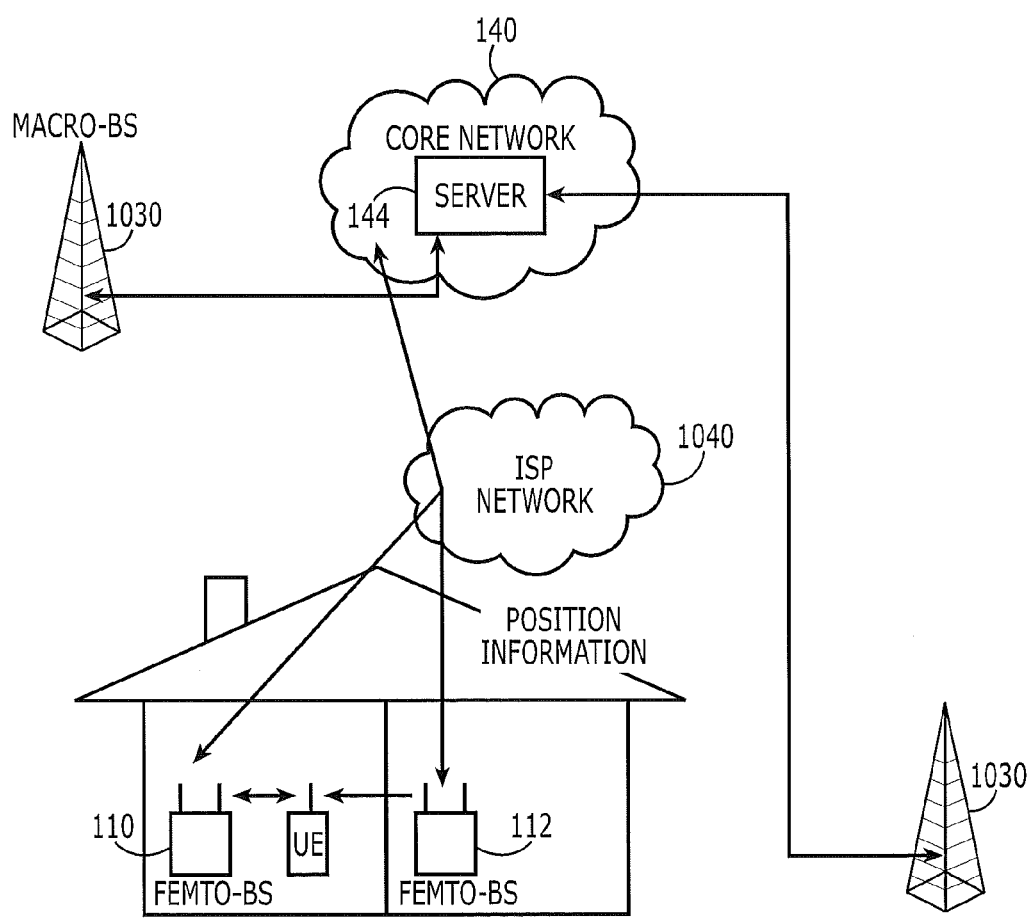

Referring now to FIG. 12, in other embodiments, femto-BS 110 can obtain its position with assistance from another nearby femto-BS 112 that has already computed its own position. The femto-BS 110 position could be assumed to be the same as the nearby femto-BS 112 with some uncertainty which may be quantified based on the measured path loss to the nearby femto-BS 112, as was described in connection with FIG. 3. The measured path loss could also be used to determine a distance from the nearby femto-BS 112, as was described in connection with FIG. 4. If the femto-BS 110 has multiple antennas, they may be used to estimate a coarse direction for the nearby femto-BS 112. The direction and distance estimates could be used together to obtain a rough estimate of the position of the femto-BS 110, if desired.

In other embodiments, as was described in connection with FIG. 5, the femto-BSs 110, 112 may communicate with each other over the wired backhaul rather than over the air. This may alleviate the need for the femto-BS 110 to have extra RF hardware in the case of frequency division duplexing (FDD) between the uplink and downlink. The femto-BSs 110, 112 could communicate with one another with assistance from the core network 140.

Moreover, as was described in connection with FIG. 6, if a UE 120 is in the vicinity of both femto-BS 110, 112, the uplink status reports from the UE 120 and/or other communications can be used by a server 144 in the core network 140 to determine that the two femto-BS 110, 112 are close to each other. The status reports could take the form of scanned cells and associated signal strengths communicated by the UE 120 to the core network 140. The core network 140 can then inform the femto-BS 110 with unknown position that it is in proximity to another femto-BS 112 with a known position. The position of this femto-BS can be supplied by the server 144. The femto-BS 110 can then use the position of the other femto-BS 112 with some uncertainty added or use some of the techniques discussed earlier to determine its own position.

In other embodiments, the position of multiple femto-BSs may be computed by propagating the position computation using techniques described herein across many femto-BSs. Hence, for example, there may be multiple femto-BSs in close proximity with only one of them being able to compute their position using GPS. The position of this femto-BS can then be propagated to the other femto-BS(s) with the other femto-BS(s) optionally refining their own position using the techniques described herein.

In other embodiments, the position of the femto-BS 110 is computed using information from the ISP that provides the ISP network 1040 through which the femto-BS 110 connects back into the core network 140. The ISP assigns the IP address for the femto-BS 110. In some embodiments, the IP address itself may be used to obtain a very coarse estimate of where the femto-BS 110 is located without any information from the ISP. In other embodiments, the ISP network 1040 may provide a more accurate location to the core network 140 which then provides the information to the femto-BS 110. Alternately, the ISP network 1040 may provide a location directly to the femto-BS.

Other embodiments may apply to any white space device, not just a femto-BS. According to US FCC rules, a white space device is required to compute its position to within 50 meters and to query the database to determine which channels are free for use. A portable device may also register with multiple locations and use a free channel or channels that are common to the set of locations. This allows a portable/mobile device to use white space spectrum in a small region rather than at just a single location.

As described above, positioning of femto-BS 110 or white space devices may not always have the desired accuracy (e.g., GPS indoors). In some embodiments that were described in connection with FIGS. 1, 8 and 9, the ability to register with multiple locations for a portable white space device is used to allow such a device to access white space spectrum even when the accuracy of the device's computed position is worse than the 50 meter requirement. This may be achieved as illustrated in FIG. 13.

Figure 13:
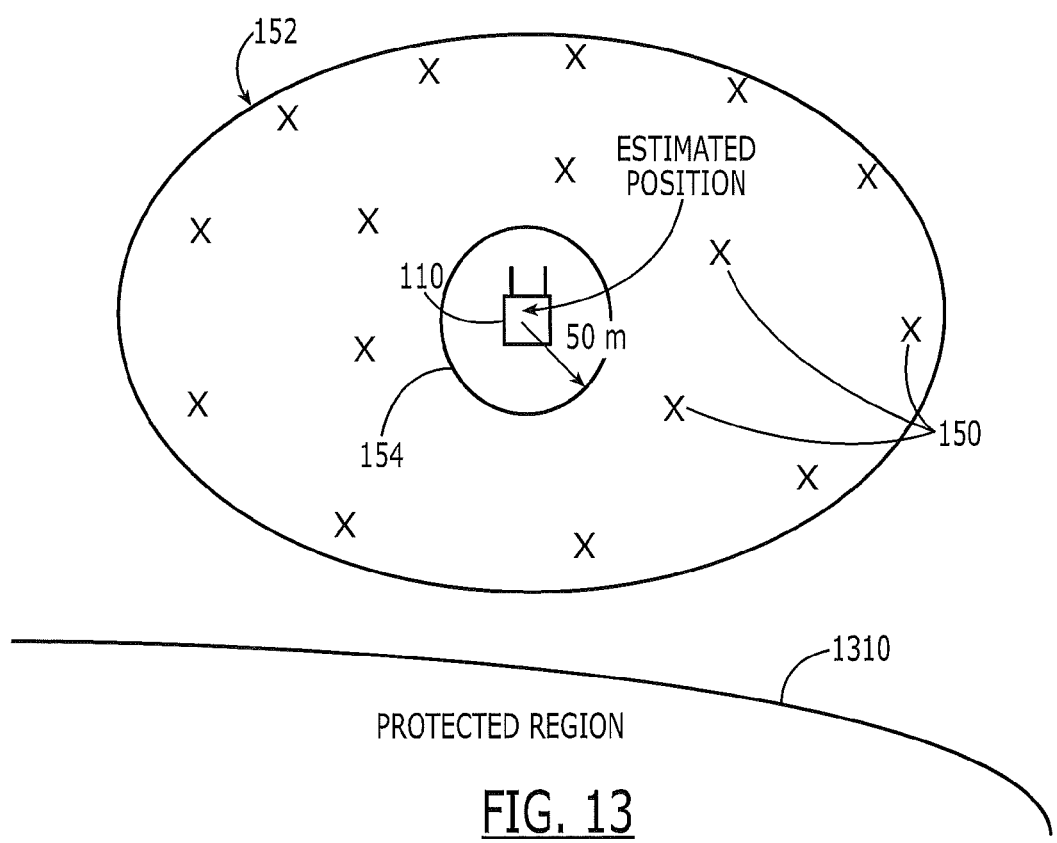

Referring now to FIG. 13, when the position of a white space device 110 is computed, an estimate of the accuracy of the position is also available with cellular based and GPS positioning methods. Accuracy estimates may be available in terms of uncertainty regions 152 or may at the very least be translated into uncertainty regions 152. When the uncertainty region 152 is larger than a circle 154 with 50 meter radius centered around the position, the white space device 110 uses a set of multiple locations 150 spanning the larger uncertainty region 152 to query the database. If there is a common free channel across all of these locations 150, the whitespace device 110 then uses this channel while the device is stationary, as was described in connection with FIGS. 8 and 9. If there is no common free channel then white space spectrum is not accessed. If the device is moved, then the procedure needs to be followed once again. A protected region 1310 where transmission is not allowed is thereby not infringed.

Thus, embodiments of FIG. 13 can exploit the use of the FCC rules allowing multiple locations for a portable device with a degree of mobility to allow the use of a white space device that is stationary but has a higher degree of position uncertainty.

Accordingly, various embodiments described herein can enable the use of white space spectrum that is managed using a database, by femto-BSs that may be easily deployed, potentially even by the end user. Various embodiments provide ways for the position of the femto-BS to be computed using various positioning methods available in mobile networks, with or without an associated UE that may be a special UE or a generic UE. Various embodiments described herein also allow white space devices with inaccurate position estimates to use white space spectrum.

Various embodiments were described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Various embodiments described herein can operate in any of the following Radio Access Technologies: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE ($3^{rd}$ Generation Partnership Project Long Term Evolution) and/or 3GPP LTE-A (LTE Advanced). For example, GSM operation can include reception/transmission in frequency ranges of about 824 MHz to about 849 MHz and about 869 MHz to about 894 MHz. EGSM operation can include reception/transmission in frequency ranges of about 880 MHz to about 914 MHz and about 925 MHz to about 960 MHz. DCS operation can include transmission/reception in frequency ranges of about 1410 MHz to about 1785 MHz and about 1805 MHz to about 1880 MHz. PDC operation can include transmission in frequency ranges of about 893 MHz to about 953 MHz and about 810 MHz to about 885 MHz. PCS operation can include transmission/reception in frequency ranges of about 1850 MHz to about 1910 MHz and about 1930 MHz to about 1990 MHz. 3GPP LTE operation can include transmission/reception in frequency ranges of about 1920 MHz to about 1980 MHz and about 2110 MHz to about 2170 MHz. Other Radio Access Technologies and/or frequency bands can also be used in various embodiments described herein. All these systems are designed to operate in a variety of bands typically known as the International Mobile Telecommunications (IMT) bands that are defined by the International Telecommunications Union—Radio Communication Bureau (ITU-R) and can, in general, be located in frequency ranges between 200 MHz and 5 GHZ within the current state of the art. It should, however, be noted that various embodiments described herein are equally applicable for any radio system, and are not restricted in any way to the IMT bands in any way.

For purposes of illustration and explanation only, various embodiments of the present invention were described herein in the context of wireless user terminals or user equipment that are configured to carry out cellular communications (e.g., cellular voice and/or data communications). It will be understood, however, that the present invention is not limited to such embodiments and may be embodied generally in any wireless communication terminal that is configured to transmit and receive according to one or more radio access technologies.

As used herein, the term "wireless user terminal" includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "wireless user terminal" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the term "base station" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit such as a digital processor, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system; apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

The invention claimed is:
1. A wireless communication method, comprising:
    determining a position of a first wireless base station by obtaining a position of a nearby second wireless base station and determining the position of the first wireless base station from the position of the nearby second wireless base station that was obtained and a direction between the first wireless base station and the nearby second wireless base station;
    determining a wireless communication frequency to be used by the first wireless base station based upon the position of the first wireless base station that was determined; and
    communicating by the first wireless base station over the frequency that was identified,
    wherein the determining the wireless communication frequency to be used by the first wireless base station based upon the position of the first wireless base station that was determined comprises querying a database that is external of the first wireless base station to identify the wireless communication frequency that can be used at a respective one of a plurality of locations surrounding and spaced apart from the position of the first wireless base station that was determined.
2. The method according to claim 1 wherein determining the position of the first wireless base station from the position of the nearby second wireless base station that was obtained comprises identifying the position of the first wireless base station as the position of the nearby second wireless base station that was obtained.

3. The method according to claim 1 wherein determining the position of the first wireless base station from the position of the nearby second wireless base station that was obtained comprises determining the position of the first wireless base station from the position of the nearby second wireless base station that was obtained and from a path loss between the first wireless base station and the nearby second wireless base station.

4. The method according to claim 1 wherein obtaining a position of a nearby second wireless base station comprises:
   requesting the position of a nearby second wireless base station from a core network; and
   obtaining the position of the nearby second wireless base station from the core network.

5. The method according to claim 4 further comprising the following:
   after requesting the position of a nearby second wireless base station from the core network, identifying the nearby second wireless base station using communications from a wireless user terminal that is receiving signals from both the first wireless base station and the nearby second wireless base station.

6. A wireless communication method, comprising:
   determining a position of a first wireless base station by obtaining a position of a nearby second wireless base station and determining the position of the first wireless base station from the position of the nearby second wireless base station that was obtained;
   identifying one or more frequencies that can be used at a respective one of a plurality of locations surrounding and spaced apart from the position of the first wireless base station that was determined;
   comparing the one or more frequencies that were identified for the respective ones of the plurality of locations to identify a common frequency that can be used at the plurality of locations surrounding and spaced apart from the position of the first wireless base station that was determined; and
   communicating by the first wireless base station over the common frequency that was identified,
   wherein the identifying the one or more frequencies that can be used at the respective one of the plurality of locations surrounding and spaced apart from the position of the first wireless base station that was determined comprises querying a database that is external of the first wireless base station to identify the one or more frequencies that can be used at the respective one of the plurality of locations surrounding and spaced apart from the position of the first wireless base station that was determined.

7. The method according to claim 6 wherein the position of the first wireless base station that was determined defines a region of position uncertainty and wherein the plurality of locations surrounding and spaced apart from the position of the first wireless base station span the region of position uncertainty.

8. A wireless base station comprising:
   a wireless transceiver; and
   a processor that is configured to control the wireless transceiver, to obtain a position of a nearby wireless base station and to determine a position of the wireless base station from the position of the nearby wireless base station that was obtained, wherein the processor is further configured to:
   identify one or more frequencies that can be used at a respective one of a plurality of locations surrounding and spaced apart from the position of the wireless base station that was determined by querying a database that is external of the wireless base station to identify the one or more frequencies that can be used at the respective one of the plurality of locations surrounding and spaced apart from the position of the wireless base station;
   compare the one or more frequencies that were identified for the respective ones of the plurality of locations to identify a common frequency that can be used at the plurality of locations surrounding and spaced apart from the position of the wireless base station that was determined; and
   communicate by the wireless base station over the common frequency that was identified.

9. The wireless base station according to claim 8 wherein the processor is configured to determine a position of the wireless base station from the position of the nearby wireless base station that was obtained by performing operations comprising identifying the position of the wireless base station as the position of the nearby wireless base station that was obtained.

10. The wireless base station according to claim 8 wherein the processor is configured to obtain a position of a nearby wireless base station by performing operations comprising:
    requesting the position of the nearby wireless base station from a core network; and
    obtaining the position of the nearby wireless base station from the core network.

11. The wireless base station according to claim 10:
    wherein the requesting the position of the nearby wireless base station from a core network comprises communicating the requesting the position of the nearby wireless base station from the wireless base station to the nearby wireless base station via the core network; and
    wherein the obtaining the position of the nearby wireless base station from the core network comprises communicating the position of the nearby wireless base station from the nearby wireless base station to the wireless base station via the core network.

12. The wireless base station according to claim 8 wherein the wireless base station and the nearby wireless base station are re-deployable wireless base stations.

13. A wireless communication system device comprising:
    an input/output interface; and
    a processor that is configured to perform operations comprising:
    obtaining one or more frequencies that can be used at a respective one of a plurality of locations surrounding and spaced apart from a wireless base station in response to a measure of a position of the wireless base station that is received from the input/output interface;
    comparing the one or more frequencies that were obtained for the respective ones of the plurality of locations to determine a common frequency that can be used at the plurality of locations surrounding and spaced apart from the wireless base station; and
    communicating the common frequency over the input/output interface,
    wherein the obtaining the one or more frequencies that can be used at the respective one of the plurality of locations surrounding and spaced apart from the wireless base station comprises querying a database to identify the one or more frequencies that can be used at the respective one of the plurality of locations surrounding and spaced apart from the wireless base station.

14. The device according to claim 13 wherein the measure of the position of the wireless base station includes a region of position uncertainty and wherein the plurality of locations surrounding and spaced apart from the wireless base station span the region of position uncertainty.

15. The device according to claim 13 wherein the one or more frequencies that can be used at a respective one of the plurality of locations surrounding and spaced apart from the wireless base station comprise unlicensed frequencies.

16. The device according to claim 13 wherein the input/output interface and the processor are included in a server or are included in the wireless base station.

* * * * *

UNITED STATES PATENT AND TRADEMARK OFFICE
CERTIFICATE OF CORRECTION

PATENT NO.        : 8,958,835 B2                                        Page 1 of 1
APPLICATION NO.   : 13/042038
DATED             : February 17, 2015
INVENTOR(S)       : Koorapaty et al.

It is certified that error appears in the above-identified patent and that said Letters Patent is hereby corrected as shown below:

In the specification

In Column 10, Line 64, delete "UE 110" and insert -- UE 120 --, therefor.

In Column 15, Line 58, delete "(DVD/BlueRay)." and insert -- (DVD/BluRay). --, therefor.

Signed and Sealed this
Thirteenth Day of October, 2015

Michelle K. Lee
*Director of the United States Patent and Trademark Office*